United States Patent [19]
Forse et al.

[11] 3,827,425
[45] Aug. 6, 1974

[54] COOKING METHOD AND APPARATUS

[75] Inventors: Harry D. Forse; Eldon W. Brown, both of Anderson, Ind.

[73] Assignee: Food-Quik Products, Inc., Anderson, Ind.

[22] Filed: Dec. 3, 1970

[21] Appl. No.: 94,682

[52] U.S. Cl............... 126/369, 126/377, 99/234 A
[51] Int. Cl. ........................................... A47j 27/06
[58] Field of Search ............ 126/20, 369, 377, 379, 126/369.2, 369.3; 99/234 R, 234 A

[56] References Cited
UNITED STATES PATENTS

| | | | |
|---|---|---|---|
| 1,636,768 | 7/1927 | Ford | 126/369 |
| 2,060,434 | 11/1936 | Vincent | 126/20 |
| 2,526,974 | 10/1950 | Schipanski | 126/20 UX |
| 3,385,288 | 5/1968 | Lohr et al. | 126/379 |
| 3,592,668 | 7/1971 | Denk | 126/369 X |

Primary Examiner—William F. O'Dea
Assistant Examiner—William C. Anderson
Attorney, Agent, or Firm—John W. Melville; Albert E. Strasser; Stanley H. Foster

[57] ABSTRACT

Cooking apparatus including a sealable chamber adapted to contain a food article which is indirectly heated by a steam jacket surrounding the chamber. An inlet valve is provided for pressurizing the cooking chamber with steam, and an adjustable vent valve is provided which in conjunction with the inlet valve permits a controlling of the pressure within the chamber and the flow of steam therethrough, thereby regulating moisture content and transfer of heat energy.

Method of cooking wherein a food article is heated in a pressurized atmosphere having a constant flow of steam therethrough; after the article is fully cooked under these conditions, the pressurized atmosphere may be exhausted and the food article indirectly heated to remove surface moisture.

2 Claims, 3 Drawing Figures

INVENTOR/S
HARRY D. FORSE
ELDEN W. BROWN

BY *Melville, Strasser, Foster and Hoffman*
ATTORNEYS

INVENTOR/S
HARRY D. FORSE
ELDEN W. BROWN

BY *Melville, Strasser, Foster and Hoffman*
ATTORNEYS

3,827,425

COOKING METHOD AND APPARATUS

BACKGROUND OF THE INVENTION

This invention relates to a method and apparatus for cooking and/or reheating food articles. Specifically, the invention relates to a method and apparatus for cooking and/or warming food articles in a pressurized atmosphere.

Pressure cooking devices of various types are now widely used by the restaurant business for the rapid preparation of food. On the one hand, particularly in those restaurants depending upon rapid food preparation and service, it is customary to cook the various food items in advance of the lunch and dinner hour rush periods. For example, chicken pieces can be cooked 2 to 4 hours prior to the lunch or dinner traffic, and then rapidly reheated during the rush period for service to the customer.

On the other hand, it is also known that pressure cooking devices can be used for cooking food items from the raw to the fully cooked state. Generally speaking, such devices which fully cook food items depend upon the addition of various additives such as grease or the like to the cooking chamber.

Keeping the foregoing comments in mind, it is an object of this invention to provide a method and apparatus which can be used to rapidly reheat precooked food to serving temperature, and at the same time preserve the proper cooked appearance and food quality.

It is a further object of this invention to provide a method and apparatus which can accomplish the reheating operation more rapidly than has heretofore been possible.

Still a further object of the invention is to provide a method and apparatus which can be utilized to fully cook food items from the raw state without the addition of grease or the like.

A specific object of this invention is to provide a pressure cooking apparatus with a valve arrangement such that a pressurized cooking atmosphere is maintained, and a high heat energy transfer is promoted.

Another specific object of the invention is to provide a method and apparatus wherein excess surface moisture on the food item can be eliminated.

SUMMARY OF THE INVENTION

The apparatus of this invention contemplates a vessel having a sealable cooking chamber therein. The vessel may be surrounded by a steam jacket which communicates with a boiler providing a supply of steam under pressure. Thus, a food article in the cooking chamber may be heated indirectly by means of the steam within the jacket.

A steam inlet valve is provided in the wall of the cooking chamber so that steam from the jacket may, when desired, be admitted into the cooking chamber to pressurize it. A vent passage and a needle valve are provided for bleeding off only a portion of the steam admitted into the cooking chamber. Thus, a continuous flow of steam is maintained to promote a rapid transfer of heat energy to the food article in the cooling chamber. Varying the setting of the vent bleeder valve will also control the moisture content of the pressurized atmosphere within the cooling chamber.

The method of this invention contemplates that the food item is heated in a pressurized atmosphere through which a continuous flow of steam is maintained. This operation is utilized to fully cook a food item.

After a predetermined time period (sufficient to fully cook the food item) the supply of pressure is cut off, and the cooking chamber is vented to atmosphere. Heat is continuously applied to the exterior of the cooking chamber, so that a relatively dry, unpressurized atmosphere is maintained within the chamber, thereby facilitating a removal of surface moisture.

DESCRIPTION OF THE PREFERRED EMBODIMENT

Figure 1:
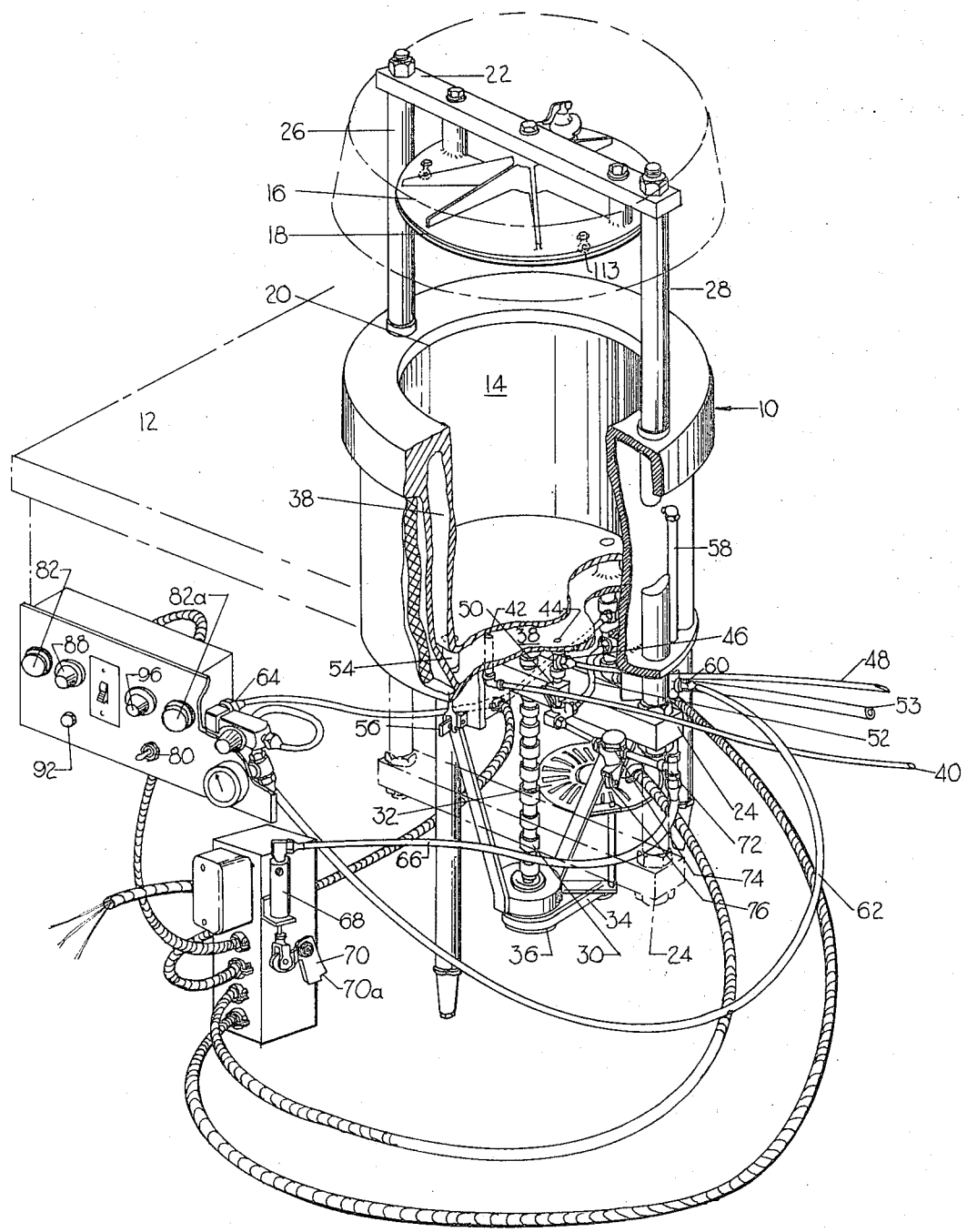
FIG. 1 is a schematic, perspective view showing the cooking apparatus according to this invention.

The device of this invention includes the vessel indicated generally at 10 which may be cast of aluminum or any other suitable material. In normal utilization, the vessel 10 will be mounted in a table or countertop 12 of a restaurant or other food service establishment.

The interior of the vessel 10 defines a cooking chamber 14 which may be sealed closed by means of the piston-type lid 16. It will be observed that the lid 16 may be provided with an annular groove carrying the O-ring 18 which will be in sealing relationship with the tapered surface 20 at the upper edge of the cooking chamber 14 when the lid is in the closed or sealed position.

The lid 16 is carried by a yoke structure including the top and bottom bars 22 and 24 respectively, and the tubular side members 26 and 28 which slide vertically in any suitable bearing. (The solid line showing of the bottom bar 24 indicates the "up" position, while the dashed line showing indicates the "down" position.) In the embodiment shown, it will be seen that the tubular members 26 and 28 are actually slidable through portions of the vessel casting 10.

The yoke structure and lid 16 are moved up and down by means of the screw 30 which is threadedly received in the bottom bar 24, and which is driven by the motor 32, V-belt 34 and pulley 36 mounted on the lower end of the screw 30. Thus, by simply reversing direction of the motor 32, the yoke structure and lid 16 can be moved up and down.

It will be observed that the vessel casting 10 is provided with a pressure chamber 38 in its walls and bottom. Thus, the structure in effect defines a jacketed cooking chamber. The pressure chamber 38 is supplied with steam under pressure (typically on the order of 30 to 34 psi) from a boiler (not shown) passing through supply line 40 and entering the chamber at 42. The chamber 38 is also provided with a condensate return 44 which via the tee fitting 46 and line 48 returns to the boiler supply.

Under some circumstances, as, for example, when the casting 10 is cold as at initial start-up, it may contain a substantial residue of condensation which should preferably not be returned to the boiler. To this end, a valve may be included in the return line 48 which may be closed. Valve 50 which is connected to the fitting 46 is opened, permitting condensate to drain via pipes 52 and 53 to a sewer or the like. It will of course be apparent that under normal circumstances, the valve 50 will be closed, and any incidental condensate will be returned to the boiler via the passage 48.

The steam inlet valve schematically shown at 54 controls the passage of steam from the chamber 38 into the cooking chamber 14. The details of the valve 54 do not, per se, form a part of this invention. As shown, the valve 54 is actuated by the solenoid 90 (see FIG. 3) and the mechanical linkage 56. When the lid 16 sealingly closes the cooking chamber 14, and the valve 54 is opened, steam may pass from the chamber 38 into the cooking chamber 14 until such time as the pressure in the cooking chamber is equal to the boiler supply pressure.

Once this equalization of pressures is attained, there will be no further passage of steam into the chamber 14, except to replace any condensation which may occur in the cooking chamber 14. Thus, under these circumstances, the rate of heat transfer is markedly reduced.

To this end, the invention contemplates a vent passage 58 which provides communication between the cooking chamber 14 and atmosphere. In the embodiment shown, the vent passage 58 is connected to the pipe tee 60. One branch of the pipe tee 60 is connected by means of the conduit 62 to the vent valve 64 which is variable as will be explained hereinafter. The other branch of the tee 60 is connected via the conduit 66 to the cylinder 68. Thus, whenever the interior cooking chamber 14 is pressurized, a portion of the pressure will pass through the conduit 58, tee 60, and conduit 66 to extend the piston of the cylinder 68 downwardly, moving the crank arm 70 so that the notch 70a engages the bottom bar 24 of the yoke structure as a safety device. In other words, this will prevent the opening of lid 16 when the interior cooking chamber is under pressure.

In the embodiment shown, the conduit 66 is provided with the pipe tee 72 which is connected to the exhaust valve 74, communicating via the conduit 52 with the drain pipe 53. The exhaust valve is operated via the mechanical linkage 76 in response to solenoid 94 seen in FIG. 3 to provide a rapid and complete exhausting of all pressure from within the cooking chamber 14.

Thus it will be seen that the vent passage 58 communicates with both a rapid exhaust valve 76 and a precision bleeder valve 64. By controlling these two valves, the escape of pressure from within the cooking chamber 14 can be accurately controlled as will be explained hereinafter.

Figure 3:
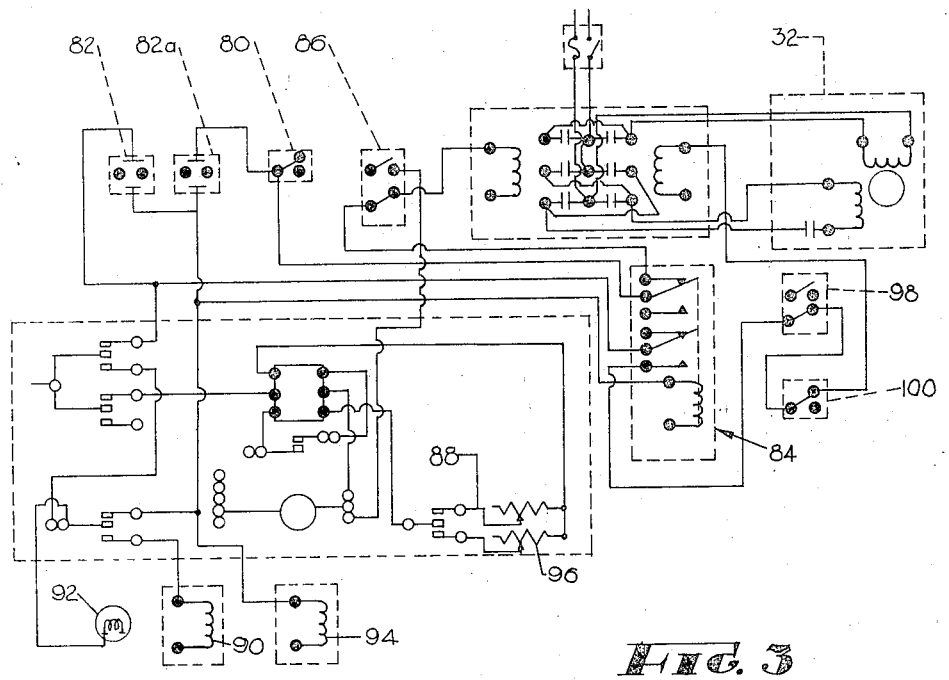
FIG. 3 is an electrical schematic diagram illustrating the controls for the apparatus.

Turning now to FIG. 3, one embodiment of the electrical circuitry for this invention will be described. The switch indicated at 80 controls the mode of operation. When in the up position shown in FIG. 3, the operation is manual; in the down position which is not shown, an automatic cycle of operation will begin.

In any event, in the manual mode of operation, simultaneous operation of the control buttons 82 and 82a will actuate the motor 32 to raise and lower the lid 16. By means of a stepping relay 84, successive pushing of the buttons will alternately raise or lower lid 16.

During manual operation, any or all of the controls discussed hereinafter may be adjusted or actuated during any portion of the cycle.

With the manual/automatic switch 80 in the automatic cycling position, actuation of the control button 82 and 82a as indicated before will operate the motor 32 so as to bring the lid 16 to the closed or sealed position. When it reaches the lowermost position, it will actuate the feeler of the limit switch 86 which will simultaneously cut off power to the motor 32 and supply power to the timer control 88 which is effective to energize solenoid coil 90 which will open the steam inlet valve 54. This will permit steam to pass from the chamber 38 to the interior of the cooking chamber 14. Pilot light 92 may be connected in this circuit.

When the preset time of the timer control 88 has expired, it will simultaneously de-energize the coil 90 thereby closing the steam valve 54 and energize solenoid coil 94 to open exhaust valve 74. Thus, the supply of steam under pressure to the cooking chamber 14 is stopped, and the pressure within the chamber is exhausted.

The timing out of timer 88 is also effective to actuate the timer 96. When the preset time of timer 96 has expired, it will energize the stepping relay 84 to supply current to the motor 32 to raise the lid 16. When the lid 16 reaches the full up position, it will actuate the limit switch 98 thereby stopping the motor.

The circuit may also include a safety switch 100 which is provided with a feeler to sense the position of the cranks arm 70a shown in FIG. 1. This switch will prevent energization of the motor when the notch 70a is engaging the bottom bar 24 of the yoke structure.

The timers 88 and 96 described earlier are part of an electronic escapement type timer having a rapid advance motor. The embodiment shown includes two separately variable timing functions, heretofore referred to as timers 88 and 96. More sophisticated variations of this arrangement will permit an increase in the number of timer functions performed. For example, an additional timer control could be utilized in place of or in addition to the manually actuated bleeder valve 64.

Figure 2:
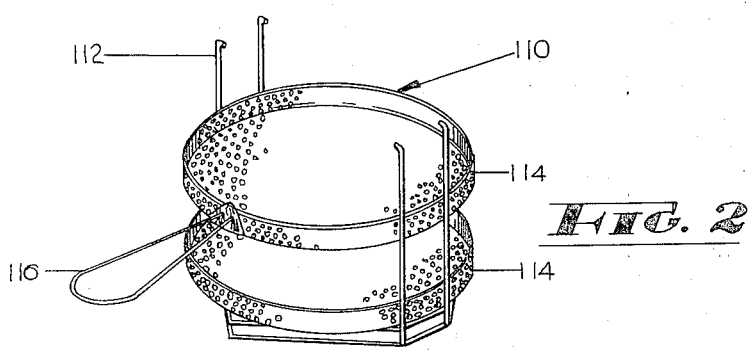
FIG. 2 is a perspective view showing the rack utilized to place food items in the apparatus of this invention.

It is believed that a brief description of the operation of the device will facilitate a complete understanding of the invention. The food article to be cooked may be placed in a food rack structure indicated generally at 110 and shown in perspective in FIG. 2. The structure includes the hooks 112 which are adapted to be engaged in suitable eyes 113 on the underside of lid 16 (see FIG. 1). The structure also includes one or more individual food trays 114. If desired, a detachable handle 116 can be utilized for removing trays from the rack structure or for exchanging trays and the like. It will of course be understood that the handle is normally detached when the structure is in operation.

In any event, the food article to be cooked will be placed in the food rack structure 110, which is in turn fastened to the underside of the lid 16. Upon actuation of the appropriate controls, the food articles are lowered into the unpressurized cooking chamber 14 and the lid 16 moved into a sealing position. At this time, these food articles will be subjected only to the heat radiating from the pressurized wall and bottom of the vessel 10.

The cooking chamber 14 may then be pressurized by opening the valve 54. As soon as the pressure in the interior of the vessel reaches the boiler pressure, no more steam will enter the cooking chamber except for the small amount necessary to replace incidental condensation. In order to promote a high heat energy transfer, it has been discovered that it is desirable to provide a continuous addition of steam into the cooking chamber 14. It has been found that when boiler steam generating capacity is sufficient to maintain a high pressure with bleeder valve 64 only partially open, the cooking cycle is speedily accomplished in a minimum moisture content environment which is desirable with certain foods. Other foods may require cooking in a high moisture content environment and this is accomplished by opening bleeder valve 64 sufficiently to drop the pressure in cooking chamber 14. The degree of moisture content of the cooking environment is therefore determined by the setting of bleeder valve 64. In some circumstances it is desirable to remove the surface moisture from the food articles and this is accomplished by closing steam inlet valve 54, and either simultaneously or at a timed interval later, opening exhaust valve 74, thereby exhausting all pressure from the cooking chamber 14. At this time the food articles in the cooking chamber 14 will be subjected only to the heat radiating from the pressurized walls and bottom of the vessel 10 for a timed continuation of the cycle sufficient to dry or remove surface moisture from the food articles.

The following table gives certain exemplary data for the warming and cooking of various food items:

complete disclosure of this invention. No limitations are intended except as specifically set forth in the claims which follow.

The embodiments of the invention in which an exclusive property or privilege is claimed are defined as follows:

1. Cooking apparatus for use with a supply of steam under pressure comprising:
   a. a vessel having a sealable cooking chamber therein;
   b. a steam jacket surrounding said vessel;
   c. means for supplying steam under pressure to said jacket;
   d. inlet valve means for permitting the passage of said steam from said jacket into said cooking chamber;
   e. means for actuating said inlet valve means;
   f. vent passage means for said cooking chamber, said vent passage providing communication between said chamber and atmosphere;
   g. vent valve means for said vent passage;
   h. means for actuating said vent valve means; and
   i. control structure effective to actuate in timed sequence said means for actuating said inlet valve and said means for actuating said vent valve means.

TYPICAL WARMING/COOKING SETTINGS (30 to 34 p.s.i.)—Do Not Vary Because of Quantity of Pieces

| Food | Timer 88 | Bleeder 64 | Timer 96 | Results |
|---|---|---|---|---|
| Pre-cooked chicken in pieces held up to 4 hours in refrigerator (36°). (Bones are not chilled.) | 2 Min. | Very slightly open. | 1 Min. | Appearance of freshly deep fat cooked pieces, including eye-appeal of crust. Temperature ready-to-serve. |
| Purpose of above is to allow use of regular equipment to precook chicken (11 to 13 minutes cooking time) in advance of rush hours and be able to serve quickly from apparatus of this invention. | | | | |
| Pre-cooked (½ lb. approx.) Broccoli Green Beans (french cut) Corn Peas (still frozen but loosely separated) | 4 to 4½ Min. | Slightly open | 15 Sec. | Excellent appearance. Temperature ready-to-serve. Note: Requires longer setting of Timer 88 if not loosely separated. |
| Frozen lobster tail raw—4 to 5 oz. size thaw just enough to slit shell and turn out (expose) meat of tail. | 3 to 3½ min. Maximum | Open as possible without dropping pressure below 28 p.s.i. to get maximum moisture. | 0 Open at once after blow-down. | Perfect for serving! Tender and not over-cooked. Note: Heavy tail of 15 oz. requires only 3½ to 4 minutes maximum on Timer 88 |
| Fresh on-the-cob sweet corn ears. refrigerated (36°)— not frozen. | 4 Min. | Medium to slightly open. | 0 Open at once after blow-down. | Hot, juicy, and just right for serving. |

The method of this invention is well suited to the cooking of other items such as chicken pieces or steak from the raw condition. However, inasmuch as no grease or other adulterating products are used in the process, the color of the cooked product may be less than satisfactory for restaurant purposes. Color can readily be added to the process of this invention by means of commercially available prepared mixes well known for these purposes.

It is believed that the foregoing constitutes a full and

2. The cooking apparatus claimed in claim 1 wherein said control structure is effective via said inlet and vent valve actuating means to open said inlet valve and said vent valve means, the opening of said vent valve means being restricted with respect to the opening of said inlet valve; thereafter to close said inlet valve; and thereafter to fully open said vent valve means, all while said cooking chamber is sealed.

* * * * *